(12) United States Patent
Rorke

(10) Patent No.: US 8,871,003 B2
(45) Date of Patent: Oct. 28, 2014

(54) PROCESS FOR CONTROLLED OXIDATION OF A FERROUS SOLUTION

(75) Inventor: Gary Vernon Rorke, Brighton (AU)

(73) Assignee: BHP Billiton Olympic Dam Corporation Pty Ltd., Melbourne, Victoria (AU)

(\*) Notice: Subject to any disclaimer, the term of this patent is extended or adjusted under 35 U.S.C. 154(b) by 82 days.

(21) Appl. No.: 13/130,890

(22) PCT Filed: Nov. 24, 2009

(86) PCT No.: PCT/AU2009/001528
§ 371 (c)(1),
(2), (4) Date: Aug. 24, 2011

(87) PCT Pub. No.: WO2010/057274
PCT Pub. Date: May 27, 2010

(65) Prior Publication Data
US 2011/0296951 A1 Dec. 8, 2011

(30) Foreign Application Priority Data
Nov. 24, 2008 (AU) .................................. 2008906086

(51) Int. Cl.
C22B 3/04 (2006.01)
C22B 5/00 (2006.01)
C22B 15/00 (2006.01)
C22B 3/02 (2006.01)
C22B 3/06 (2006.01)
C22B 3/00 (2006.01)
C22B 60/02 (2006.01)
C22B 3/44 (2006.01)

(52) U.S. Cl.
CPC ............... *C22B 3/06* (2013.01); *C22B 15/0067* (2013.01); *C22B 3/02* (2013.01); *C22B 23/0415* (2013.01); *C22B 60/0221* (2013.01); *C22B 3/44* (2013.01)
USPC .................. 75/743; 75/384; 75/399; 266/168

(58) Field of Classification Search
USPC ........................................................... 75/384
See application file for complete search history.

(56) References Cited

U.S. PATENT DOCUMENTS 6,143,259 A \* 11/2000 Arias ............................. 423/47
6,280,501 B1 8/2001 Ferron

FOREIGN PATENT DOCUMENTS

GB 1494564 12/1977
WO WO 03/054238 7/2003

OTHER PUBLICATIONS

Ho et al. Iron(II) oxidation by SO2/O2 for use in uranium leaching, Hydrometallurgy 2007, vol. 85, p. 183-192.\*
http://en.wikipedia.org/wiki/Impeller, Apr. 2013.\*
Zhang et al. Iron (II) oxidation by SO2/O2 in acidic media: Part I. Kinetics and mechanism, Hydrometallurgy 55(2000)229-245.\*

\* cited by examiner

*Primary Examiner* — Roy King
*Assistant Examiner* — Xiaowei Su
(74) *Attorney, Agent, or Firm* — Brinks Gilson & Lione; G. Peter Nichols

(57) ABSTRACT

A process for producing a ferric containing solution by the controlled oxidation of a ferrous containing solution, said process including providing a solution containing at least ferrous ions; treating the solution with one or more inlet gases containing sulfur dioxide and oxygen in order to oxidize said ferrous ions to ferric ions, wherein the delivery rate of the sulfur dioxide gas is oxidation rate limiting; and controlling the concentration of dissolved oxygen in said solution at an optimum value.

11 Claims, 7 Drawing Sheets

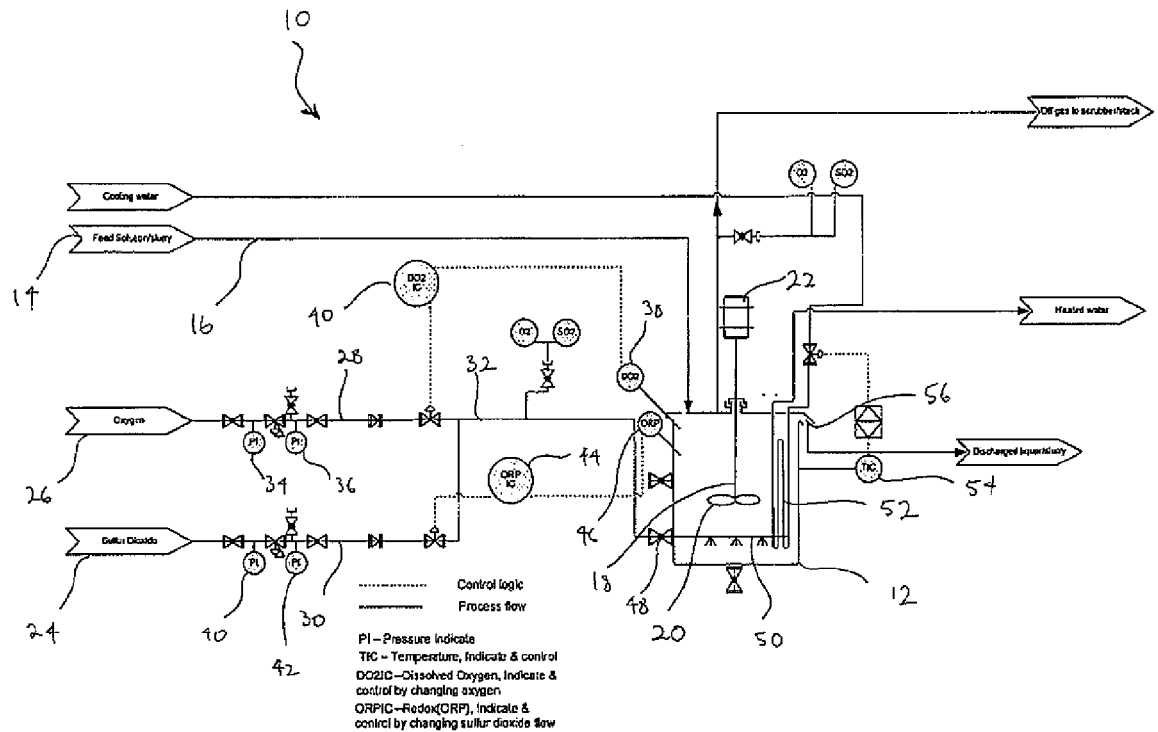
FIGURE 1
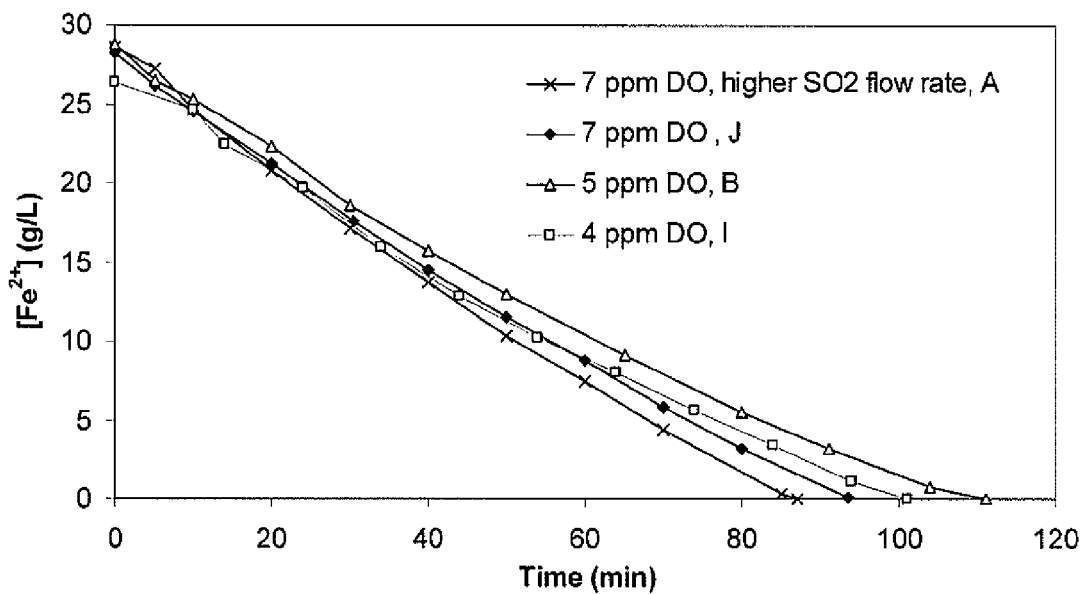
FIGURE 2  Oxidation of CLTO with $SO_2/O_2$ at 70°C

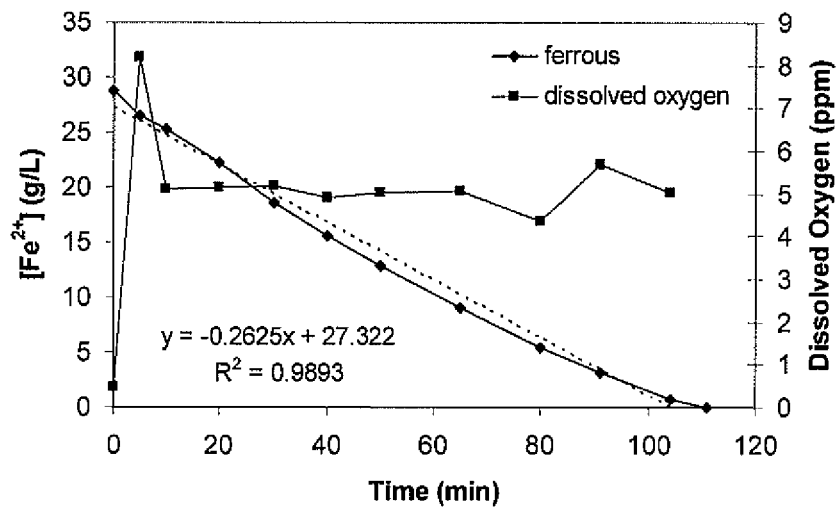
FIGURE 3    $SO_2/O_2$ Oxidation of CLTO at 5 ppm Dissolved Oxygen (test $SO_2$ B)
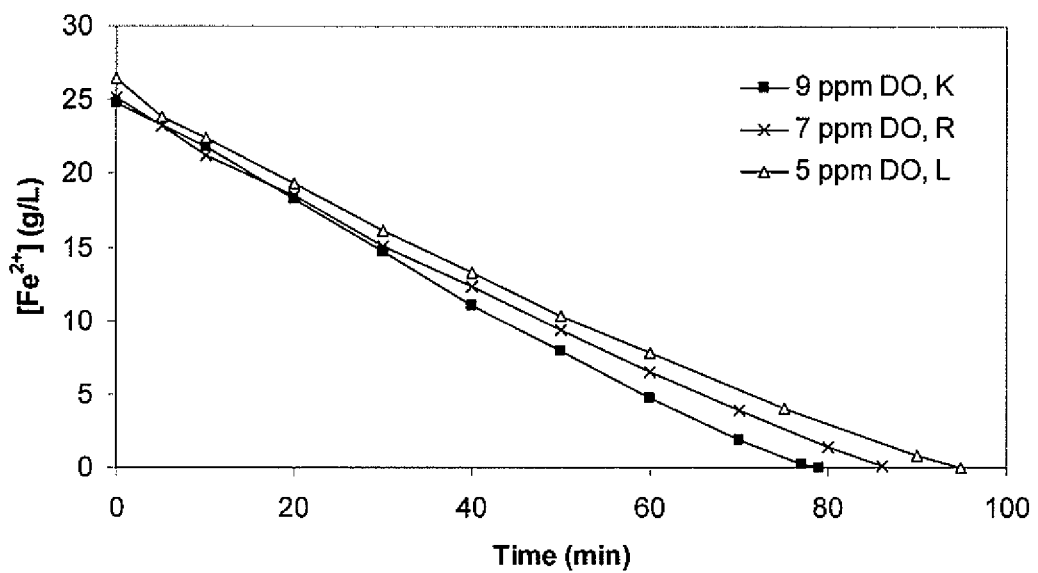
FIGURE 4    $SO_2/O_2$ Oxidation of CLTO+raffinate (5.5:1 v/v) at 70°C

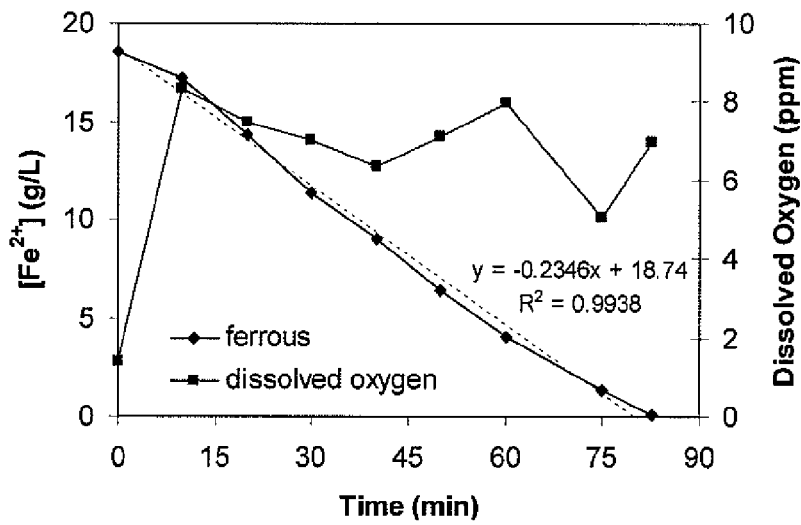
FIGURE 5  SO$_2$/O$_2$ Oxidation of CLTO:raffinate = 1:1 (v/v) at 70°C (SO2 E)
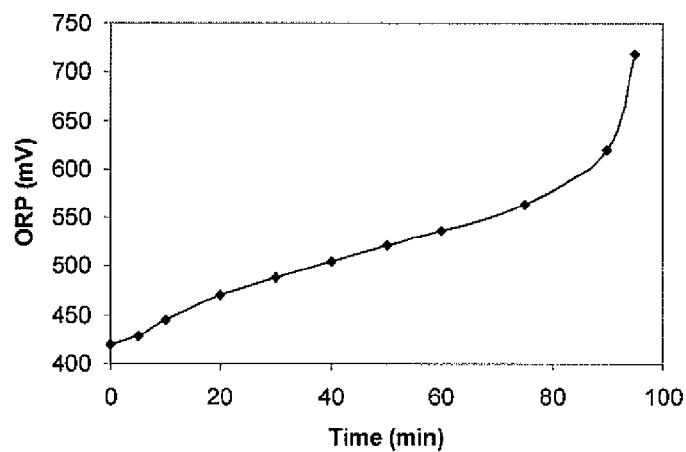
FIGURE 6  ORP vs Time for SO$_2$/O$_2$ oxidation of CLTO:raffinate =5.5:1 at 5 ppm Dissolved Oxygen and 70°C

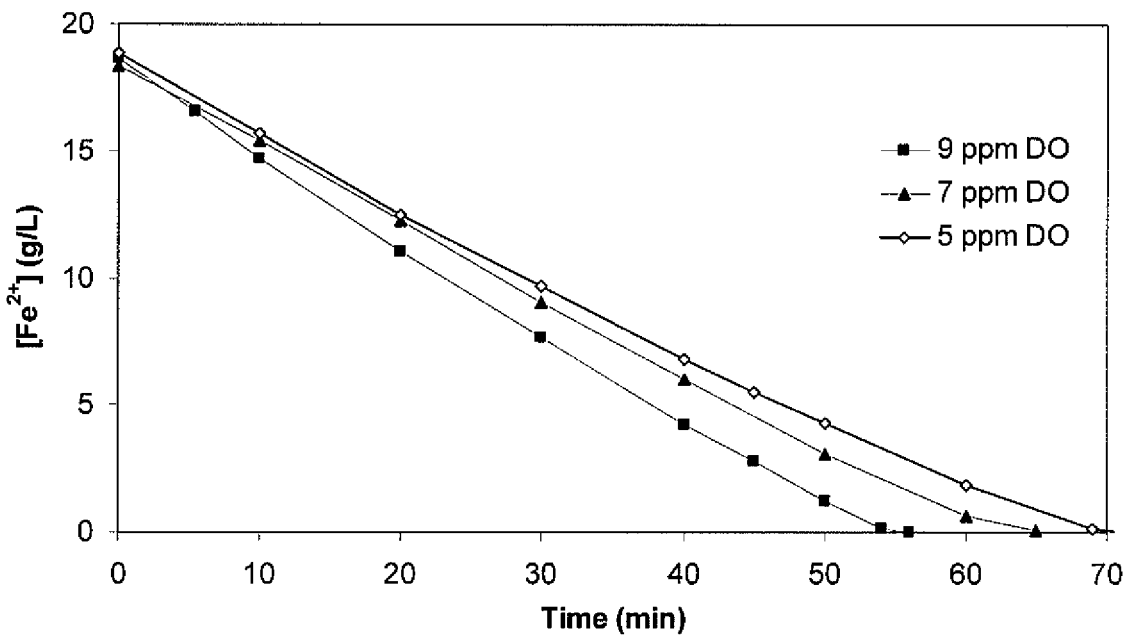
FIGURE 7 SO$_2$/O$_2$ Oxidation of CLTO:raffinate:PLS (5.5:1:6.3 v/v) at 70°C
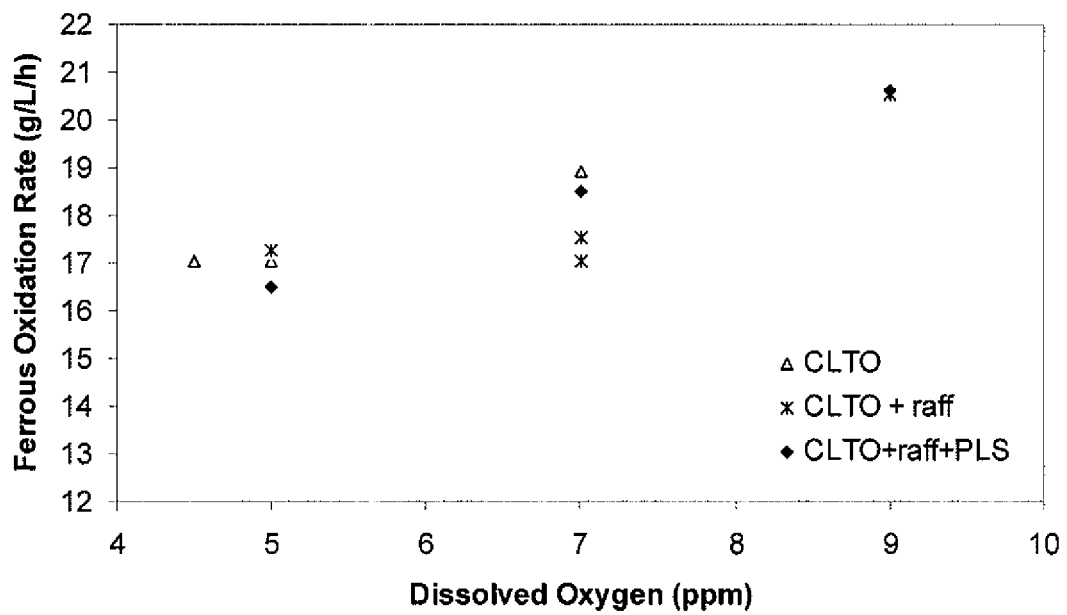
FIGURE 8 Oxidation of Three Different Plant Liquor Combinations at 7 ppm Dissolved Oxygen and 70°C with SO$_2$/O$_2$

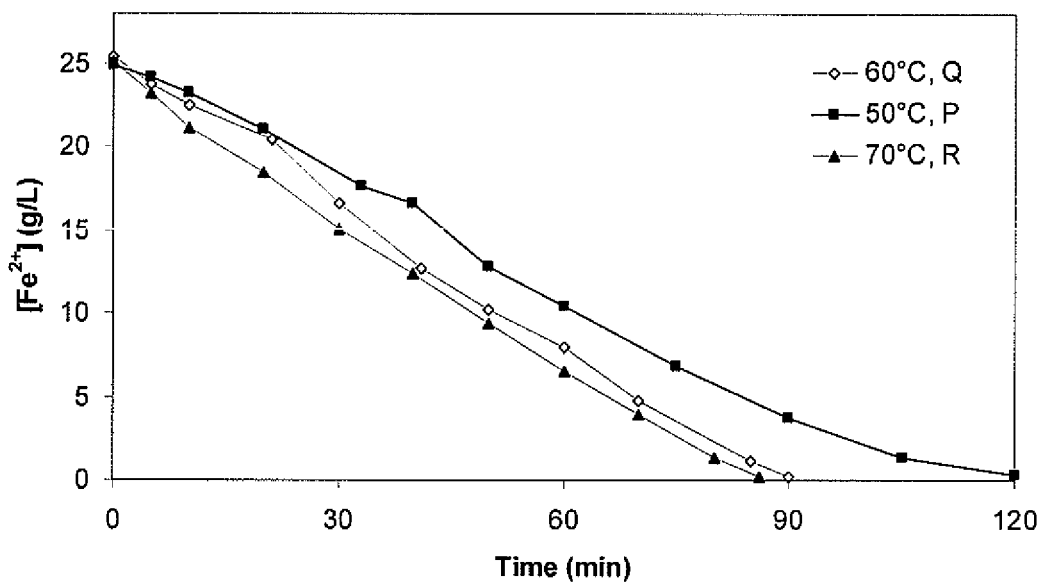
Figure 9   Effect of Temperature on $SO_2/O_2$ Oxidation of CLTO:raffinate = 5.5:1 at 7 ppm Dissolved Oxygen
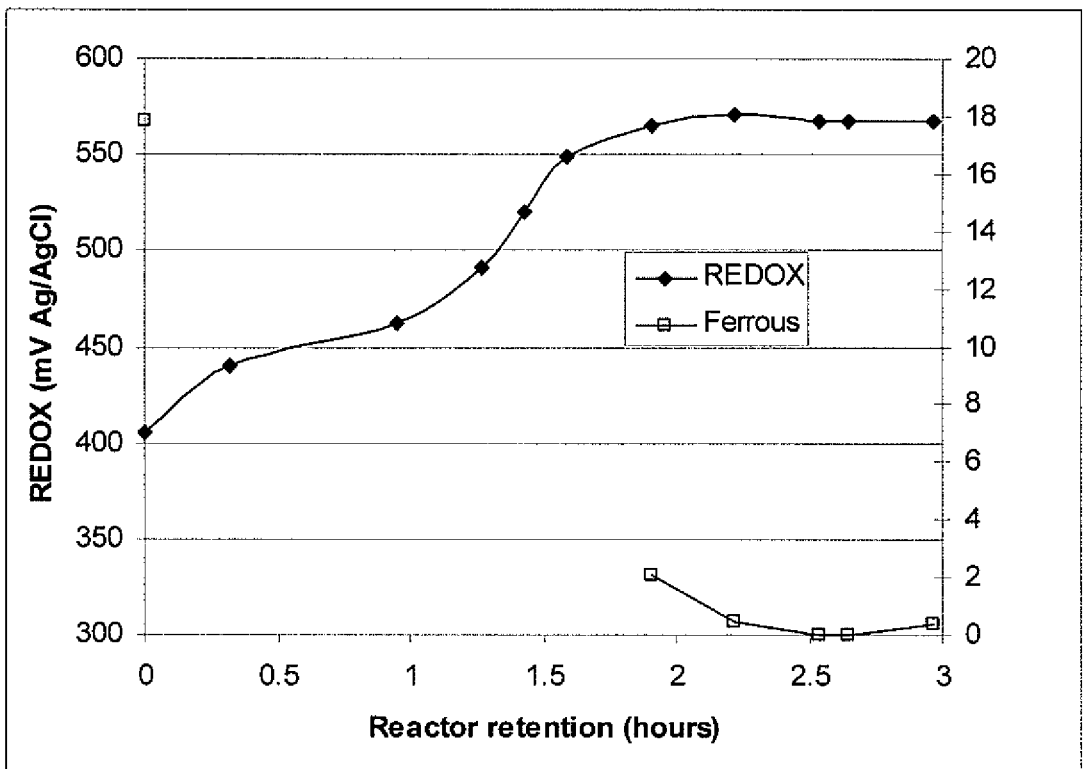
Figure 10   The Redox (mV Ag/AgCl) and Ferrous Concentration versus Reactor Retention (hours)

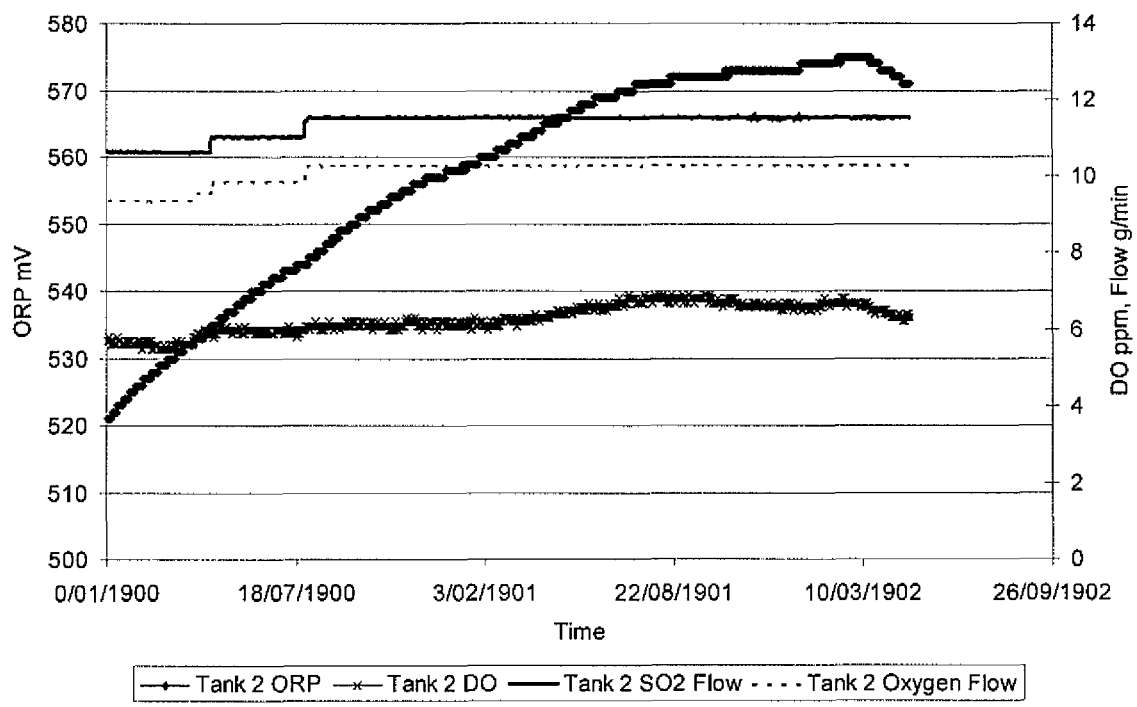
Figure 12  Gas flows, dissolved oxygen and ORP (Redox) for tank 113

PROCESS FOR CONTROLLED OXIDATION OF A FERROUS SOLUTION

This application claims priority to PCT Application Serial No. PCT/AU2009/001528 filed Nov. 24, 2009 published in English on May 27, 2010 as PCT WO 2010/057274; and to Australian Application No. 2008906086 filed Nov. 24, 2008, the entire contents of each are incorporated herein by reference.

FIELD OF THE INVENTION

This invention relates to a process for the controlled oxidation of a ferrous ion containing solution by treatment with sulfur dioxide and oxygen. In a particularly preferred embodiment, the invention relates to a process for leaching a metal value containing material which includes a step of controlled ferrous oxidation.

BACKGROUND TO THE INVENTION

Many hydrometallurgical processes generate large quantities of by product ferrous containing liquors. Examples of such processes include the recovery of uranium, copper, nickel, cobalt, zinc from their ores, ore concentrates or tailings. The ferrous ions represent a potential, inexpensive source of oxidant, which can be oxidised to ferric ions and recycled for use as an oxidant to one or more stages of the process.

One industry approach of oxidising ferrous ions is by treating the ferrous solution with oxygen and sulfur dioxide gas which are available at some sulfide ore processing plants.

The ferrous oxidation reaction can be written as follows:

$$2FeSO_4 + O_2(aq) + SO_2(aq) \rightarrow Fe_2(SO_4)_3 \quad (1)$$

However, if the amount of $SO_2$ is too high relative to $O_2$ the ferrous oxidation reaction is undesirably reversed and ferric ions are reduced to ferrous ions. The ferric reduction reaction can be written as:

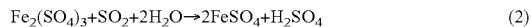

$$Fe_2(SO_4)_3 + SO_2 + 2H_2O \rightarrow 2FeSO_4 + H_2SO_4 \quad (2)$$

It has previously been attempted to find a critical ratio between gaseous oxygen and sulfur dioxide, above which the ferrous to ferric reaction occurs and below which ferric is reduced to ferrous, and to operate the ferrous oxidation process above that critical ratio.

The inventor has recognised that this approach is problematical because the reactions take place in the aqueous phase and the rate of diffusion between the introduced gases and the liquor is dependent on a number of factors, such as:

- the partial pressure of oxygen in the gas;
- the configuration of the reactor in which the oxidation process takes place, in particular its height (that is the hydrostatic pressure within the reactor);
- the degree of agitation of the ferrous solution within the reactor, in particular the type of agitator used and its power; and
- the rate of utilisation of the dissolved oxygen in solution by chemical reaction.

The inventor has also recognised that while it may be possible to determine an optimal gaseous sulfur dioxide to oxygen ratio for particular process conditions and/or a particular reactor, that ratio is unlikely to be applicable under different process and/or reactor conditions, for example, where an operation is being scaled up from the laboratory or pilot plant to commercial scale.

It is accordingly an object of the present invention to provide a process for the controlled oxidation of a ferrous ion containing solution which overcomes or at least alleviates one or more of the above discussed disadvantages of the prior art.

DESCRIPTION OF THE INVENTION

The present invention is based upon the realisation by the inventor that the ferrous oxidation reaction can be controlled so as to minimise or substantially avoid the undesirable ferric reduction reaction by:

Controlling the delivery rate of gaseous $SO_2$ so that it is oxidation rate limiting, thereby ensuring that the concentration of $SO_2$ dissolved in solution remains relatively low; and Controlling the concentration of dissolved oxygen (DO) at an optimum value at which the process remains oxidative, thereby ensuring that there is an excess of oxygen dissolved in solution.

The present invention provides in a first aspect, a process for producing a ferric containing solution by the controlled oxidation of a ferrous containing solution, said process including:

providing a solution containing at least ferrous ions;
treating the solution with one or more inlet gases containing sulfur dioxide and oxygen in order to oxidize said ferrous ions to ferric ions, wherein the delivery rate of the sulfur dioxide gas is oxidation rate limiting; and
controlling the concentration of dissolved oxygen in said solution at an optimum value.

Accordingly, the ferrous oxidation reaction has a predetermined rate set by the delivery rate of sulfur dioxide gas. In addition, the concentration of dissolved oxygen is maintained at an optimum value whilst controlling the ferrous oxidation reaction at the predetermined rate.

By controlling the process in this manner, the inventor has found that ferrous oxidation can be effectively controlled independently of reactor design and other process conditions. By fixing the rate of delivery of sulfur dioxide such that it is rate limiting for the oxidation reaction and controlling the concentration of DO in solution at the optimum desired value, the process can then be reproduced under different process and/or reactor conditions by designing and operating the process at the same DO value. Typically the DO would be adjusted by adjusting the oxygen delivery rate.

In one embodiment, the ferrous containing solution is agitated during the oxidation process. Typically, agitation is effected by a motor driven agitator provided within the reactor. Examples of suitable agitators include agitators having a high solidity downward pumping impeller or a radial type impeller.

In one embodiment, the optimum value of DO concentration is controlled by varying the flow rate of the oxygen containing gas introduced into said solution. However, alternative ways of controlling DO including adjusting the partial pressure of oxygen in the oxygen containing gas or adjusting the amount of agitation of said solution, in particular the amount of power transferred to the solution by a motor driven agitator.

The ferrous containing solution may be a liquor derived from the hydrometallurgical processing of ores, concentrates, waste materials such as tailings, or combinations thereof. The liquor may comprise or be part of a barren leach solution, a pregnant leach solution, a slurry, a raffinate, a thickener overflow, a solution derived from dissolution of gangue minerals, a solution resulting from reduction of ferric ions, or any other suitable liquor derived from a hydrometallurgical plant.

The sulfur dioxide and oxygen gases may be introduced into the solution in the form of a gaseous mixture. However, in one embodiment the sulfur dioxide and oxygen are introduced in separate gas streams.

As previously noted, the rate of oxygen transfer is dependent on, inter alia, the partial pressure of oxygen in the gas.

The oxygen gas may be introduced in the form of air, oxygen enriched air or substantially pure oxygen gas. The gas composition selected will largely depend on the rate of oxidation required and the temperature of operation as temperature affects the solubility of the oxygen.

Where the oxygen and sulfur dioxide are introduced as a gaseous mixture, the purity of sulfur dioxide will also affect oxygen partial pressure and is therefore an important factor for the rate of oxygen transfer. At high oxidation rates and temperatures above ~60° C. (e.g. with chemical oxygen demand in the region of 500 to 6000 g $O_2/m^3$ of reactor volume/hour) both a high purity (+80%) sulfur dioxide and industrially produced (+93%) oxygen would be preferred. At reasonably low rates of ferrous oxidation and or lower temperatures (e.g. with chemical oxygen demand of less than 500 g $O_2/m^3$ of reactor volume/hour) it may be preferred to use sulfur dioxide produced by a smelter or by burning sulfur dioxide in air (12-20% v/v) in combination with industrially produced (+93%) oxygen. At very low chemical oxygen requirements low purity sulfur dioxide in combination with air can be used. The optimal for any given process will need to be determined by a consideration of operating temperature and reactor volume versus the cost of producing purer gases.

Preferably, the sulfur dioxide and oxygen are introduced into solution by sparging through a gas emission device, such as a sparge ring or other gas dispersion device or diffuser. Where the solution is agitated by a motor driven agitator, preferably the sulfur dioxide and oxygen are introduced into solution below the agitator, in order to enhance dispersion of the gases throughout the liquor.

In order to ensure a low concentration of sulfur dioxide in the liquor and hence ensure that process remains oxidative the delivery rate of sulfur dioxide is selected so as to be rate limiting with respect to the ferrous oxidation reaction. Accordingly, the delivery rate of sulfur dioxide is typically below that required for the maximum ferrous oxidation rate achievable for the prevailing process and/or reactor conditions.

In general the rate, as controlled by the flow rate of sulfur dioxide, is so limited to ensure that the level of oxygen transfer from gaseous phase to aqueous phase required in order to effect the reaction with the sulfur dioxide and maintain the necessary dissolved oxygen is within the range appropriate for commercial sized equipment.

In one embodiment, the maximum ferrous oxidation rate does not exceed 27 grams per liter per hour. In another embodiment, the ferrous oxidation rate is no lower than 0.1 grams per liter per hour.

The temperature of the oxidation process is typically elevated and may be up to around 80° C. Typically, the temperature is greater than 40° C. The maximum temperature may be 70° C.

The optimum value of dissolved oxygen in solution may be a maximum of 20 parts per million (ppm). In an embodiment, the optimum DO is a maximum of 10 ppm. The optimum value of dissolved oxygen may be a minimum of 0.5 ppm. The optimum value of dissolved oxygen may be in the range from about 3 to 7 ppm.

The process of the present invention is particularly applicable for use in a process for recovering a target metal from a material containing at least that target metal.

Accordingly, the present invention provides in a second aspect, a process for recovering a target metal from a material containing at least said target metal, including the steps of:
(a) preparing a ferric containing oxidising solution by:
   (i) treating an acidic solution containing at least ferrous ions with one or more gases containing sulfur dioxide and oxygen in order to oxidize said ferrous ions to ferric ions, wherein the delivery rate of the sulfur dioxide gas is oxidation rate limiting; and
   (ii) controlling the concentration of dissolved oxygen in said solution at an optimum value;
(b) leaching said material with a leachant including said ferric containing solution; and
(c) recovering said target metal from the resultant leachate.

The material containing the target metal may be one or more of an ore, an ore concentrate or a waste material such as ore tailings, slag or dust. In a preferred embodiment, the material comprises uranium containing ore, ore concentrate, tailings, slag or dust.

As used subsequently herein the abbreviation "SIL" means "sulfur dioxide and oxygen in leach" and refers to the process of the invention when used in a leaching process to recover a target metal from a material containing the target metal.

The target metal can be metals such as but not limited to uranium, copper, nickel, zinc, molybdenum or cobalt. Preferably, the target metal is selected from one or more of uranium and copper.

In the case of recovery of uranium from uraninite ore the relevant redox reaction taking place during leaching is:

$$UO_2 + 2Fe^{3+} \rightarrow UO_2^{2+} + 2Fe^{2+} \quad (3)$$

As is evident from Equation (3), oxidation of uraninite to the uranyl ion $UO_2^{2+}$ results in reduction of ferric to ferrous. For example, ferrous ions may be derived from the dissolution of ferrous containing gangue minerals such as siderite or chlorite. Ferrous also arises from the reaction of ferric ions with base metal sulfide minerals, such as chalcocite, bornite, covellite, chalcopyrite, pentlandite, and sphalerite. The ferrous ions may then be re-oxidised to ferric by the controlled oxidation process of the invention. Preferably this is done in situ by addition of $SO_2$ and $O_2$ gases to a portion of the acidic ferrous liquor leach that is recycled to the leach reactor after decantation, or an acidic ferrous containing plant liquor derived from another stage in the overall hydrometallurgical treatment of the material.

More preferably, the reoxidation of ferrous to ferric is done continuously or semi continuously by treatment with sulfur dioxide and oxygen in accordance with the controlled oxidation process of the invention.

Recovery of uranium from its ores is commonly carried out by a process which includes leaching the ore or a concentrate thereof, typically by using a leachant including sulfuric acid and an oxidising agent (oxidant). The dissolved uranium is usually separated from the leach solutions by an ion exchange or solvent extraction process. This produces a purified uranium-containing solution from which uranium is recovered by precipitation, commonly by treating with ammonia to precipitate uranium yellowcake product.

The recovery process of the present invention may be used in the treatment of uranium containing ore tailings that are obtained by processing mined ore in a flotation plant. More particularly, the process may be used for leaching of uranium containing tailings, such as the flotation tailings from the concentration of a copper ore. By way of example, the mined ore may be copper-uranium-gold ore from applicant's Olympic Dam mine in South Australia.

The process of the present invention advantageously enables production of oxidising solutions, for use in the leaching of ore tailings, by reaction of ferrous containing plant liquor with sulfur dioxide and oxygen to produce ferric containing oxidising solutions. Sulfur dioxide is conveniently produced from oxidation of copper sulfides in the flash furnace of the plant, and oxygen can conveniently be provided by air. Those oxidising solutions may then be added to the tailings leach as an alternative to the conventional oxidant possibly together with additional acid.

In a preferred embodiment, sulfur dioxide and oxygen are injected continuously or semi continuously during the leaching step (b) in order to re-oxidise ferrous to ferric ions.

The present invention additionally provides in a third aspect, a process for recovering a target metal from a material containing at least said target metal, including the steps:
(a) preparing a slurry of the material;
(b) leaching said slurry with an acidic leachant including a ferric containing solution prepared by:
  (i) treating an acidic, ferrous solution with one or more gases containing sulfur dioxide and oxygen in order to oxidize said ferrous ions to ferric ions, wherein the delivery rate of the sulfur dioxide gas is oxidation rate limiting; and
  (ii) controlling the concentration of dissolved oxygen in said slurry at an optimum value; and
(c) recovering said target metal from the resultant leachate.

Accordingly, the ferric containing solution may be generated either prior to mixing with the slurry and/or it may be formed in situ after mixing the ferrous containing solution with the slurry. In one embodiment of the third aspect of the invention, sulfur dioxide and oxygen gas are injected into a reactor containing the slurry and the acidic ferrous solution such that ferric ions are formed in situ in the reactor. In another embodiment of the third aspect, an acidic ferrous solution is at least partially oxidised by treatment with sulfur dioxide and oxygen, then added to the slurry in a reactor where injection of sulfur dioxide and oxygen is continued to continue ferrous oxidation in situ.

Preferably, the reactor includes a motor driven agitator for mixing and dispersing the sulfur dioxide and oxygen gas throughout the slurry. In this embodiment, the oxidation of ferrous ions to ferric ions accordingly takes place in situ in the leach reactor.

In general, the ferrous solution may be derived from one or more of various plant liquors including, barren or pregnant leach liquors, or raffinates from solvent extraction or ion exchange.

The ferrous ions in solution may be derived from solutions reporting to the leach reactor such as those derived from leaching of the ore minerals. Ferrous ions also are produced from the reaction of acid with other minerals within the ore, concentrate, dust, slag or tailings. For example, ferrous ions may be derived from the dissolution of ferrous containing gangue minerals such as siderite or chlorite. Ferrous also arises from the reaction of ferric ions with one or more base metal sulfide minerals, such as chalcocite, bornite, covellite, chalcopyrite, pentlandite, and sphalerite.

In a preferred embodiment of the third aspect of the invention, the leached slurry is directed to a thickener and the thickener overflow is recycled to the leach reactor as diluent. By recycling the overflow in this manner the solids density in the leach reactor can be controlled to an optimum level for facilitating satisfactory diffusion of oxygen within the slurry. This is because oxygen diffusion can be impaired at a high solids density in the slurry.

BRIEF DESCRIPTION OF THE DRAWINGS

The invention will be better understood by reference to the following Examples and accompanying drawings, in which:

FIG. 1 is a schematic diagram of apparatus suitable for use with the process of the present invention;

FIG. 2 is a plot of ferrous concentration over time in CLTO at 70° C. for dissolved oxygen concentrations of 4 ppm, 5 ppm and 7 ppm;

FIG. 3 is a plot of ferrous concentration and dissolved $O_2$ versus time in CLTO;

FIG. 4 is a plot of ferrous concentration versus time in CLTO+raffinate (5.5:1 v/v) at 70° C. for dissolved oxygen concentrations of 5 ppm, 7 ppm and 9 ppm;

FIG. 5 is a plot of ferrous concentration and DO versus time in CLTO+raffinate (1:1 v/v) at 70°;

FIG. 6 is a plot of ORP versus time in CLTO+raffinate (5.5:1) at 5 ppm DO and 70° C.

FIG. 7 is a plot of $SO_2/O_2$ Oxidation of CLTO+raffinate+PLS (5.5:1:6.3 v/v) at 70° C.;

FIG. 8 is a plot of ferrous oxidation rate versus DO for the oxidation of three different plant liquor combinations at 7 ppm dissolved oxygen and 70° C. with $SO_2/O_2$;

FIG. 9 is a plot of ferrous concentration versus time in CLTO+raffinate (5.5:1 v/v) at 7 ppm DO at 50° C., 60° C. and 70° C.;

FIG. 10 is a plot of Redox and Ferrous Concentration (g/L) versus operating time expressed as Reactor Retention (hours)

FIG. 12 is a graph exemplifying the important control parameters of the process of the invention.

DETAILED DESCRIPTION OF PREFERRED EMBODIMENTS

Examples 1 to 4

Figure 11:
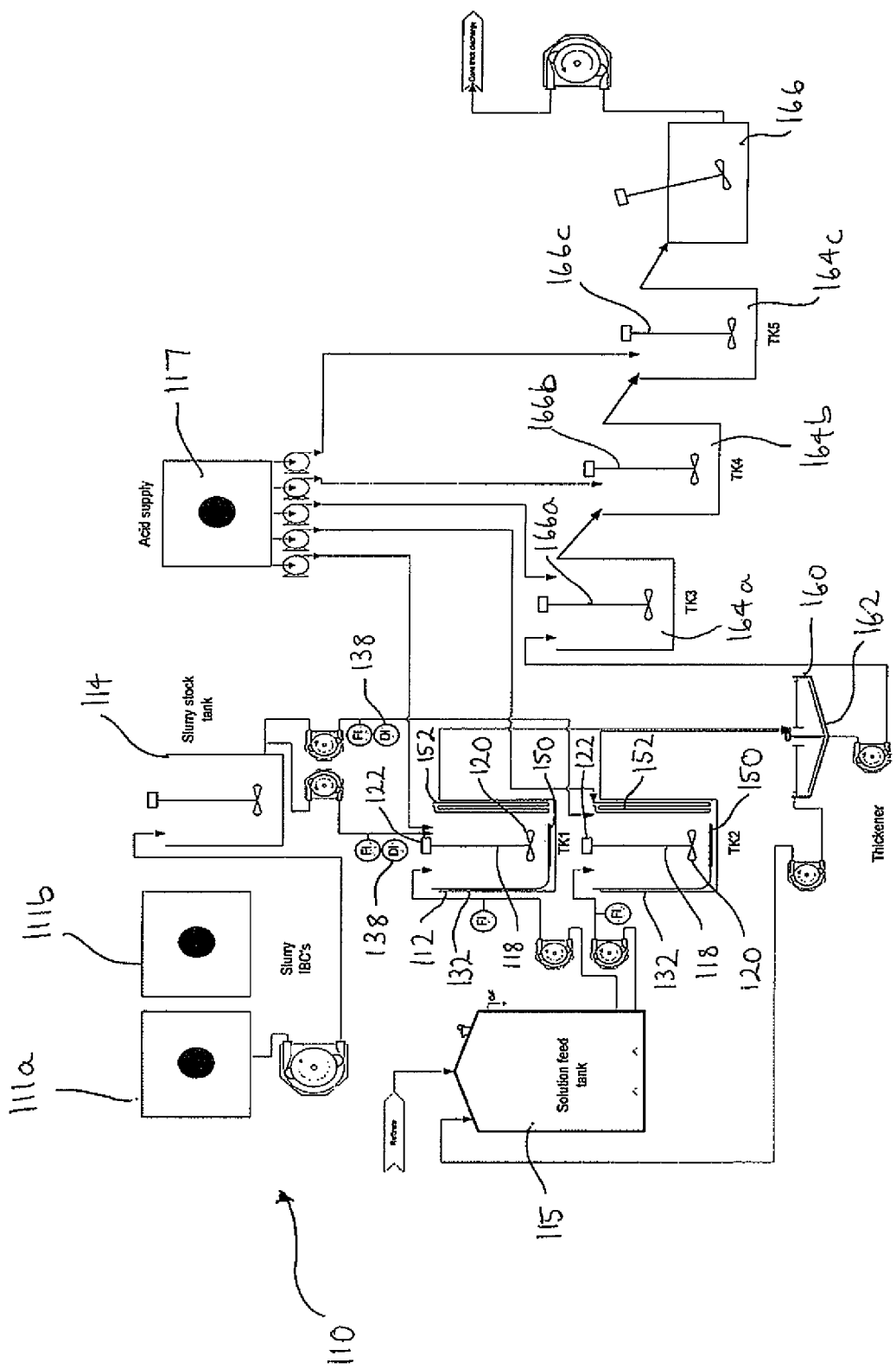
FIG. 11 is a schematic diagram of a pilot plant for conducting the process of the invention in situ in a uranium ore slurry.

FIG. 1 is a schematic diagram of a plant 10 for use with the process of the present invention as exemplified in Examples 1 to 4. The plant 10 includes a reactor 12 into which a ferrous containing feed solution or slurry 14 is fed via a conduit 16. The reactor 12 includes a dissolved oxygen sensor 38, a redox sensor 46 and an agitator 18 comprising an impeller 20 driven by a motor 22. Sources of sulfur dioxide 24 and oxygen gas 26, respectively, are in fluid communication with the reactor 12 via gas inlet conduit 32. An oxygen conduit 28 extends from the oxygen source and a sulfur dioxide conduit 24 extends from the sulfur dioxide source. The two conduits are connected to inlet conduit 32. The oxygen conduit 28 includes oxygen pressure gauges 34 and 36 and means 40 for regulating the flow of oxygen through conduit 28 in response to readings from the DO sensor 38. The sulfur dioxide conduit 30 includes sulfur dioxide pressure gauges 40 and 42 and a means 44 for regulating the flow of sulfur dioxide through conduit 30 in response to readings from the redox sensor 46. The sulfur dioxide and oxygen gases mix together in conduit 32 and the gas mixture is fed into the reactor via inlet valve 48. The gaseous mixture is then fed into a gas diffuser 50 which diffuses the gas into solution below the impeller 20, wherein can be effectively dispersed throughout the liquor or slurry in the reactor. The temperature within the reactor is controlled by means of heat exchanger 52 and measure by thermometer 54. After the process of the invention is complete, the reacted liquor or slurry is discharged from outlet 56.

In Examples 1 to 4, ferrous containing plant liquors from the Olympic Dam Ore Processing Plant were treated with $SO_2$ and $O_2$ gaseous mixtures to produce ferric oxidants for use in leaching a uranium containing ore.

Oxidation of the ferrous ions with $SO_2/O_2$ was carried out with 3.5 L of liquor in 5 L, baffled titanium tanks agitated with titanium, six-blade disk turbine impellers at 500 rpm. The tanks were 18.1 cm inside diameter and 20 cm high, and the impeller diameter was 7 cm. The gaseous mix was added through sintered spargers situated under the impeller to improve oxygen mass transfer. The temperature of the solution was controlled by placing the tanks in a water bath controlled to ±1° C. The tanks were fitted with a lid to minimise evaporation. The gas used was 99.5% oxygen, and the oxygen flow rates quoted in the Examples are of the 99.5% $O_2$ gas.

The probe for dissolved oxygen (DO) measurements consisted of a dissolved oxygen sensor with titanium wetted parts. The oxygen sensor was calibrated in tap water that had been well agitated, as close to the temperature of the experiment as possible (within 3° C.) on the day of the experiment.

The solution redox potential was monitored using a Ag/AgCl/3M KCl reference electrode and all potentials are quoted with respect to this reference.

All aliquots of the liquor samples were acidified and boiled under nitrogen for about five minutes to remove excess $SO_2$. The ferrous concentration of the boiled sample was then determined by titration with standard cerium(IV) sulfate solution. The unboiled liquor samples were filtered through 0.45 µm filters and diluted before analysis by ICP-OES (Inductively coupled plasma with optical emissions spectroscopy)

Four different ferrous containing plant liquors were tested for ferrous oxidation rates:
1. Concentrate leach thickener overflow (CLTO), derived from the concentrate leach circuit.
2. CLTO+raffinate derived from uranium solvent extraction in a 5.5:1 volume ratio of CLTO:raffinate.
3. CLTO+raffinate+pregnant leach solution (PLS) in a ratio of 5.5:1:6.3 (v/v).
4. CLTO+raffinate in a 1:1 (v/v) ratio.

These liquor combinations were chosen for use in different leaches. The compositions of the plant liquors and liquor combinations for the $SO_2/O_2$ tests are shown in Table 1 and Table 2, respectively.

For three tests, dissolved oxygen was sparged through the solution for five minutes before $SO_2$ addition, to determine the saturation oxygen concentration in solution.

TABLE 1

Composition of Plant Liquors

Solution Assays

| | Al (mg/L) | Ca (mg/L) | Cu (mg/L) | Fe Total (g/L) | $Fe^{2+}$ (g/L) | $Fe^{3+}$ (g/L) | K (mg/L) | Mg (mg/L) | Na (mg/L) | U (mg/L) | Acidity (g/L) |
|---|---|---|---|---|---|---|---|---|---|---|---|
| Process Water: | <1 | 12 | <1 | <0.001 | <0.001 | <0.001 | 22 | 23 | 915 | <1 | na |
| CLTO: | 1310 | 825 | 758 | 30 | 28 | 1.7 | 692 | 70 | 1240 | 413 | 40 |
| Raffinate: | 3520 | 864 | 345 | 17.4 | 11 | 6.6 | 1270 | 901 | 2220 | <1 | 14 |
| PLS: | 3880 | 922 | 1650 | 19.1 | 11 | 8.0 | 1420 | 955 | 2450 | 222 | 13 |

TABLE 2

Liquor Compositions for $SO_2/O_2$ Tests

| | Solution Composition | Total [Fe] (g/L) | [$Fe^{2+}$] (g/L) | [$Fe^{3+}$] (g/L) | Acidity (g/L) | Max. Measured Dissolved $O_2$ at 70° C. (ppm)* |
|---|---|---|---|---|---|---|
| 1 | CLTO | 30 | 28 | 2 | 39 | 14.1 |
| 2 | CLTO:raff = 5.5:1 (v/v) | 29 | 26 | 3 | 35 | 15.0 |
| 3 | CLTO:raff = 1:1 (v/v) | 27 | 19 | 8 | 27 | na |
| 4 | CLTO:raff:PLS = 5.5:1:6.3 (v/v) | 23 | 19 | 4 | 24 | 16.1 |

*$O_2$ was sparged through the solution at 70° C. for five minutes before $SO_2$ addition.

For most of the $SO_2/O_2$ tests, the $SO_2$ flow rate was chosen so that the maximum ferrous oxidation rate was 22 g/L/h (based on Equation 1 and 100% utilisation of $SO_2$ for ferrous oxidation). The oxygen mass transfer required for a ferrous oxidation rate of 22 g/L/h is approaching the limit for existing commercial sized plant equipment.

For 3.5 L of plant liquor, the $SO_2$ flow rate was set to 280 mL/min, unless otherwise stated.

It was observed that the test liquor pH decreased with time, so some of the $SO_2$ was reacting to form sulfuric acid, probably according to Equation 4

$$SO_2 + \tfrac{1}{2}O_2 + H_2O \rightarrow H_2SO_4 \quad (4)$$

The acid concentration was not maintained at a constant value during the tests, to simulate likely plant practice.

Example 1

Solution 1: CLTO

Table 3 sets out the conditions of each oxidation test.

TABLE 3

$SO_2/O_2$ Oxidation of CLTO at 70° C.

| Test ID | Dissolved Oxygen (ppm) | Calculated Max. $Fe^{2+}$ oxidation rate based on $SO_2$ (g/L/h) | Average $Fe^{2+}$ oxidation rate (g/L/h) | $Fe^{2+}$ oxidation rate to 4-6 g/L $Fe^{2+}$ (g/L/h) | $Fe^{2+}$ oxidation rate below 4-6 g/L $Fe^{2+}$ (g/L/h) | Increase in [$H_2SO_4$] (g/L) |
|---|---|---|---|---|---|---|
| $SO_2$ A | 7 | ~27 | 20 | 20 | 16 | 11 |
| $SO_2$ J | 7 | ~22 | 18 | 19 | 14 | 12 |
| $SO_2$ B | 5 | ~22 | 16 | 17 | 12 | 15 |
| $SO_2$ C | 5 | ~17 | 12 | 12 | na | 8 |
| $SO_2$ I | 4.5 | ~24 | 16 | 17 | 13 | 17 |

The decrease in ferrous concentration from $SO_2/O_2$ oxidation of CLTO at 70° C. and dissolved oxygen from 4-7 ppm is shown in FIG. 2.

The $SO_2$ flowrate was equivalent to a maximum $Fe^{2+}$ oxidation rate of 22-24 g/L/h, except for test $SO_2$ A, where the $SO_2$ flow rate was equivalent to a maximum $Fe^{2+}$ oxidation rate of 27 g/L/h. The test at 4.5 ppm dissolved oxygen (DO) had a slightly lower initial ferrous concentration because oxygen was sparged through the liquor for five minutes before $SO_2$ was added. It can be seen that maintaining an optimum value of dissolved oxygen in solution in all tests resulted in the process remaining oxidative. It can also be seen from Table 3 that the selectivity of the ferrous oxidation reaction (Equation 1) over the side reaction conversion to acid (Equation 3) increased with increasing dissolved oxygen in solution. Accordingly, this indicates that the value of DO sets the selectivity of the ferrous oxidation reaction versus the acid production reaction, and that higher DO values generally favour ferrous oxidation over acid production.

The ferrous oxidation rate over the entire time of the test (average ferrous oxidation rate) was calculated from the slope of the line in FIG. 3.

The ferrous oxidation rate increased as the $SO_2$ flow rate increased for the same dissolved oxygen concentration (eg. compare tests $SO_2$ A and $SO_2$ J). Test SO2 C was run at a lower $SO_2$ flow rate of 180-220 mL/min (14-17 g/L/h maximum $Fe^{2+}$ oxidation rate), compared to test $SO_2$ B which was run at 290 mL/min $SO_2$, for a dissolved oxygen concentration of 5 ppm. The ferrous oxidation rate for SO2 C was 12 g/L/h compared to 16 g/L/h for $SO_2$ B.

The calculated utilisations of $SO_2$ for ferrous oxidation over the entire time of the test are shown in Table 3. The utilisations were calculated using Equation 1.

TABLE 3

Utilisation of $SO_2$ and $O_2$ - Oxidation of CLTO with $SO_2/O_2$ at 70° C.

| Test ID | $SO_2/O_2$ ratio to 4-7 g/L $Fe^{2+}$ (v/v) | Dissolved Oxygen (ppm) | % $SO_2$ for $Fe^{2+}$ oxidation | Approximate % $O_2$ for $Fe^{2+}$ Oxidation | Sparger pore size |
|---|---|---|---|---|---|
| $SO_2$ A | 0.26-0.35 | 7 | 76 | 31 | 2 μm |
| $SO_2$ J | 0.20-0.27 | 7 | 81 | 20 | 10 μm |
| $SO_2$ B | 0.38-0.55 | 5 | 70 | 35 | 2 μm |
| $SO_2$ C | 0.50-0.72 | 5 | 68-83 | 43 | 2 μm |
| $SO_2$ I | 0.29-0.36 | 4.5 | 68 | 23 | 10 μm |

$SO_2$ calculations are for the entire time of the test, $O_2$ calculation is for steady state oxidation rate only and is an estimate since $O_2$ flowrates varied between samples.

About 70-80% of the $SO_2$ was used to oxidise ferrous at 5-7 ppm dissolved oxygen. It was observed that a substantial proportion also reacted to form sulfuric acid.

The utilisation of oxygen for $Fe^{2+}$ oxidation is also shown in Table 3. The oxygen utilisation is approximate only since the actual oxygen flowrate varied throughout the test. Use of the 10 μm pore sparger instead of a 2 μm pore sparger decreased the oxygen efficiency from 30-35% to about 20%. This is likely to be due to higher diffusion of oxygen into aqueous phase when a smaller pore size is used.

Example 2

Solution 2: CLTO+Raffinate

The decrease in ferrous concentration from $SO_2/O_2$ oxidation of CLTO+raffinate (166 mL:30 mL or 5.5:1/vv) at 70° C. is shown in FIG. 4. The $SO_2$ feed rate was equivalent to a maximum $Fe^{2+}$ oxidation rate of 22-23 g/L/h. The selectivity of ferrous oxidation reaction (1) over the acid generation reaction (3) decreased as the dissolved oxygen concentration decreased from 9 ppm to 5 ppm. Similarly to oxidation of CLTO, the ferrous oxidation rate decreased once the ferrous became depleted.

One test was run on CLTO:raffinate=1:1 (v/v) and the results are shown in FIG. 5. The $SO_2$ feed rate was equivalent to a maximum $Fe^{2+}$ oxidation rate of 17-24 g/L/h.

The ferrous oxidation rates are shown in Table 5.

TABLE 4

| Ratio CLTO:raffinate (v/v) | Test ID | Dissolved Oxygen (ppm) | Calculated Max. $Fe^{2+}$ oxidation rate based on $SO_2$ (g/L/h) | Average $Fe^{2+}$ oxidation rate (g/L/h) | $Fe^{2+}$ oxidation rate to 4-6 g/L $Fe^{2+}$ (g/L/h) | $Fe^{2+}$ oxidation rate below 3-5 g/L $Fe^{2+}$ (g/L/h) | Increase in $[H_2SO_4]$ (g/L) |
|---|---|---|---|---|---|---|---|
| 5.5:1 | $SO_2$ K | 9 | 22 | 19 | 20.5 | 16 | 10 |
| 5.5:1 | $SO_2$ R | 7 | 23 | 17 | 17.5 | 14 | 10 |
| 5.5:1 | $SO_2$ D | 7 | 19-23 | 16 | 17.0 | 10 | 10 |
| 5.5:1 | $SO_2$ L | 5 | 22 | 17 | 17.3 | 13 | 13 |
| 1:1 | $SO_2$ E* | 7 | 17-24 | 14 | 15.7 | 11 | 7 |

For the same dissolved oxygen concentration, the ferrous oxidation rates for CLTO and CLTO+raffinate (5.5:1 v/v) were similar, which was expected since the solution compositions were similar. The liquor acidity increased by about 10 g/L. About 70-86% $SO_2$ reacted to oxidise ferrous to ferric at 5-9 ppm dissolved oxygen and about 20% of the oxygen was used for ferrous oxidation when the 10 μm pore sparger was used (Table 5).

TABLE 5

Utilisation of $SO_2$ and $O_2$ - Oxidation of CLTO + raffinate with $SO_2/O_2$ at 70° C.
CLTO:raffinate = 5.5:1 (v/v) unless otherwise stated

| Ratio CLTO:raffinate (v/v) | Test ID | $SO_2/O_2$ ratio to 4-6 g/L $Fe^{2+}$ (v/v) | Dissolved Oxygen (ppm) | % $SO_2$ for $Fe^{2+}$ oxidation | Approximate % $O_2$ for $Fe^{2+}$ Oxidation | Sparger pore size |
|---|---|---|---|---|---|---|
| 5.5:1 | $SO_2$ K | 0.19-0.24 | 9 | 86 | 18 | 10 μm |
| 5.5:1 | $SO_2$ R | 0.26-0.31 | 7 | 76 | 22 | 10 μm |
| 5.5:1 | $SO_2$ D | 0.38-0.55 | 7 | 69-86 | 36 | 2 μm |
| 5.5:1 | $SO_2$ L | 0.22-0.30 | 5 | 76 | 21 | 10 μm |
| 1:1 | $SO_2$ E* | 0.61-0.86 | 7 | 59-84 | 44 | 2 μm |

$SO_2$ calculations are for the entire time of the test, $O_2$ calculation is for steady state oxidation rate only and is an estimate since $O_2$ flowrates varied between samples.

The ORP in all of the tests typically jumped when the ferrous concentration was very low as would be expected in this system where ORP is predominated by the $Fe^{3+}/Fe^{2+}$ couple in which case ORP can be assumed proportional to the log of this ratio (ie $Fe^{3+}/Fe^{2+}$ ratio was very high). A typical plot for $SO_2/O_2$ oxidation at 5 ppm dissolved oxygen is shown in FIG. 6. The initial ORP was 420 mV but climbed slowly to about 620 mV before increasing rapidly to 720 mV at 70° C. The test was halted at this point as the ferrous would have been almost completely depleted.

Example 3

Solution 3: CLTO+Raffinate+PLS

FIG. 7 shows the change in ferrous concentration from oxidation of CLTO+raffinate+PLS (166 mL:30 mL:189 mL or 5.5:1:6.3) at 70° C. The $SO_2$ feed rate was equivalent to a maximum $Fe^{2+}$ oxidation rate of 23 g/L/h. As expected, the ferrous oxidation rate increased as the dissolved oxygen in solution increased from 5 ppm to 9 ppm. Ferrous oxidation rates are tabulated in Table 6. Once more what is clearly evident is that as the dissolved oxygen set point was decreased the formation of acid (increase in acid) was favoured over the oxidation of ferrous. The ferrous oxidation rate was similar to the rates in the CLTO and CLTO:raffinate=5.5:1 liquors (FIG. 8).

The $SO_2$ and approximate $O_2$ utilisations, which are similar to the previous tests on other liquors, are shown in Table 7.

TABLE 6

Ferrous Oxidation Rates for $SO_2/O_2$ Oxidation of CLTO:raffinate:PLS at 70° C.

| Test ID | Dissolved Oxygen (ppm) | Calculated Max. $Fe^{2+}$ oxidation rate based on $SO_2$ (g/L/h) | Average $Fe^{2+}$ oxidation rate (g/L/h) | $Fe^{2+}$ oxidation rate to 4-6 g/L $Fe^{2+}$ (g/L/h) | Increase in $[H_2SO_4]$ (g/L) |
|---|---|---|---|---|---|
| $SO_2$ O | 9 | 23 | 20.6 | 20.6 | 8 |
| $SO_2$ M | 7 | 23 | 18.0 | 18.5 | 10 |
| $SO_2$ N | 5 | 23 | 16.5 | 16.5 | 13 |

TABLE 7

Utilisation of $SO_2$ and $O_2$ - Oxidation of
CLTO:raffinate:PLS with $SO_2/O_2$ at 70° C.

| Test ID | $SO_2/O_2$ ratio to 4-6 g/L $Fe^{2+}$ (v/v) | Dissolved Oxygen (ppm) | % $SO_2$ for $Fe^{2+}$ oxidation | Approximate % $O_2$ for $Fe^{2+}$ Oxidation |
|---|---|---|---|---|
| $SO_2$ O | 0.19-0.26 | 9 | 91 | 22 |
| $SO_2$ M | 0.24-0.33 | 7 | 80 | 26 |
| $SO_2$ N | 0.32-0.35 | 5 | 73 | 25 |

Example 4

Effect of Temperature

The effect of temperature from 50-70° C. on $SO_2/O_2$ oxidation of CLTO:raffinate=5.5:1 is shown in FIG. 9 and Table 9. The ferrous oxidation rates and proportion of $SO_2$ used to oxidise ferrous at 60° C. and 70° C. were the same within experimental error. However at 50° C., the oxidation rate decreased, particularly when the ferrous concentration was low at the end of the test. The average $SO_2$ utilisation for ferrous oxidation decreased from 76% at 60-70° C. to 59% at 50° C. Similarly to previous tests, the $O_2$ utilisation for ferrous oxidation was about 21-23% for the steady state part of the reaction.

TABLE 8

Effect of Temperature on Ferrous Oxidation Rate and $SO_2$ Utilisation
for CLTO:Raffinate = 5.5:1 at 7 ppm Dissolved Oxygen

| Test ID | Temperature | Average $Fe^{2+}$ oxidation rate (g/L/h) | $Fe^{2+}$ oxidation rate to 3-5 g/L $Fe^{2+}$ (g/L/h) | Increase in [$H_2SO_4$] (g/L) | % $SO_2$ for $Fe^{2+}$ oxidation |
|---|---|---|---|---|---|
| $SO_2$ R | 70° C. | 17 | 18 | 10 | 76 |
| $SO_2$ P | 60° C. | 17 | 18 | 12 | 76 |
| $SO_2$ Q | 50° C. | 13 | 15 | 14 | 59 |

$SO_2$ utilisation is for the entire time of the test

Summary of Examples 1 to 4

Accordingly, it can be seen from Examples 1 to 4 that the oxidation of ferrous can be achieved in a variety of liquors by the addition of sulfur dioxide at a predetermined rate, which is lower than the maximum achievable, whilst controlling oxygen addition rate to achieve a dissolved oxygen set point in the liquor. This can then replicated at any scale by designing the process to be able to operate at the same dissolved oxygen set point.

The $SO_2$ flow rate was chosen to give a maximum ferrous oxidation rate for the particular conditions of these examples of 22 g/L/h (assuming 100% utilisation of $SO_2$ for ferrous oxidation). However, under different physicochemical conditions, or when utilising different equipment, a different maximum ferrous oxidation rate may be appropriate, requiring a different $SO_2$ flowrate.

The Examples also show that the selectivity of the ferrous oxidation over the competing reaction to form acid decreases with decreasing dissolved oxygen. Hence, an optimum dissolved oxygen value may be selected depending on the process's requirement for acid.

The ferrous oxidation selectivity were similar in the three main liquor combinations tested for the same dissolved oxygen concentration.

Decreasing the temperature to 50° C. decreased the overall ferrous oxidation rate at 7 ppm dissolved oxygen by about 17% for the steady state part of the rate, and there was a significant decrease in the reaction rate at the end of the test.

A significant portion of the $SO_2$ reacted to form acid and the $H_2SO_4$ concentration in solution increased by about 10 g/L. This was beneficial in the case where additional acid was required for the subsequent leach of uranium concentrate.

Example 5

In Example 5, the process of invention was tested in a pilot plant at the applicant's Olympic Dam Uranium mine. The pilot plant included 5 leach reactors of 0.2 $m^3$ volume each, of which the first two reactors were used for the process of the invention.

Each reactor was equipped with heating and cooling elements to control temperature at the desired value. Each reactor had independent feeds of sulfur dioxide, air and oxygen and the flow rate of each gas could be controlled independently. The purpose of the air feed was to allow simulation of sulfur dioxide from various sources. For example sulfur dioxide produced from burning sulfur in air would be expected to have approximately 12% sulfur dioxide (v/v) and the balance nitrogen with a small amount of residual oxygen. Sulfur dioxide produced from a smelter operation would be expected to have a higher percentage sulfur dioxide and finally sulfur dioxide purified by liquefaction or produced by burning sulfur in oxygen would be pure or substantially pure $SO_2$.

The gases were delivered by a point sparger under high solidity agitators in each tank.

Each reactor had a dissolved oxygen probe and a probe to measure the ORP of solution.

Each tank had independent feeds of ferrous containing process liquor. The two liquors tested were CLTO and raffinate. The purpose of this pilot plant was to demonstrate the working of the invention in a continuous process, as well as, to establish the sulfur dioxide utilisation as function of gas type, dissolved oxygen, process solution and rate of reaction.

FIG. 10 shows a typical ferrous and ORP (REDOX) profile of a continuous test in one of the tanks. The plant was being operated at a fixed DO that was being controlled by the oxygen delivery flow rate. The sulfur dioxide feed rate was pre-set at the desired oxidation rate. That oxidation rate was determined by the feed rate of ferrous ions to the reactor. The data indicates a decrease in ferrous and consequent increase in ORP until steady state operation is achieved.

TABLE 9

Summary of continuous pilot plant trials results using Concentrate Leach Thickener Overflow (CLTO)

| Temp. (° C.) | REDOX (mV) | DO (ppm) | SO$_2$ inlet % | O$_2$ inlet % | SO$_2$ Ut % | Acid Rate (g/L/h) | Ferric Rate (g/L/h) | Acidity (g/L H$_2$SO$_4$) |
|---|---|---|---|---|---|---|---|---|
| 60 | 459 | 7.3 | 37 | 52 | 97 | 17.2 | 8.7 | 81.3 |
| 60 | 453 | 6.0 | 41 | 53 | 98 | 1.9 | 7.3 | 79.0 |
| 60 | 426 | 5.1 | 37 | 56 | 98 | 4.2 | 9.8 | 62.9 |
| 60 | 427 | 5.2 | 38 | 56 | 98 | 2.1 | 10.1 | 63.3 |
| 60 | 429 | 5.2 | 38 | 56 | 98 | 2.5 | 10.1 | 62.9 |
| 60 | 462 | 7.2 | 34 | 59 | 99 | 1.8 | 10.9 | 66.3 |
| 60 | 463 | 7.5 | 35 | 58 | 99 | 6.1 | 11.2 | 67.2 |
| 60 | 460 | 7.1 | 35 | 59 | 99 | 15.4 | 11.1 | 67.2 |
| 60 | 405 | 3.2 | 10 | 28 | 68 | 0.9 | 3.1 | 60.1 |
| 60 | 418 | 3.2 | 13 | 28 | 73 | 0.2 | 4.0 | 74.2 |
| 60 | 404 | 3.1 | 10 | 28 | 68 | 1.8 | 3.3 | 57.6 |
| 60 | 458 | 7.6 | 36 | 53 | 97 | 2.3 | 8.5 | 80.9 |
| 60 | 456 | 6.8 | 37 | 53 | 97 | 3.3 | 8.2 | 80.6 |
| 70 | 469 | 6.6 | 32 | 62 | 99 | 0.1 | 11.8 | 50.3 |
| 70 | 475 | 6.7 | 32 | 63 | 99 | 1.2 | 12.5 | 50.1 |
| 70 | 476 | 6.7 | 32 | 63 | 99 | −2.8 | 13.0 | 49.4 |
| 70 | 477 | 6.7 | 32 | 62 | 99 | −2.5 | 13.2 | 49.4 |
| 70 | 473 | 6.8 | 10 | 54 | 94 | 0.0 | 8.1 | 35.5 |
| 70 | 478 | 6.8 | 10 | 55 | 93 | −0.7 | 8.4 | 36.5 |
| 70 | 480 | 6.8 | 10 | 54 | 94 | −1.1 | 8.5 | 36.2 |
| 70 | 466 | 4.8 | 29 | 61 | 99 | 0.7 | 11.6 | 30.6 |
| 70 | 467 | 5.0 | 29 | 61 | 99 | 1.2 | 12.1 | 30.3 |
| 70 | 485 | 2.8 | 38 | 54 | 99 | — | — | — |
| 70 | 458 | 8.7 | 19 | 75 | 98 | −2.5 | 11.5 | 27.8 |
| 70 | 461 | 9.3 | 17 | 77 | 98 | 0.1 | 11.4 | 27.8 |

TABLE 11

Summary of Results for Raffinate

| Temp. (° C.) | REDOX (mV) | DO (ppm) | SO$_2$ inlet % | O$_2$ inlet % | SO$_2$ Ut % | Acid Rate (g/L/h) | Ferric Rate (g/L/h) | Acidity (g/L H$_2$SO$_4$) |
|---|---|---|---|---|---|---|---|---|
| 50 | 487 | 7.0 | 29 | 66 | 100 | 1.5 | 4.9 | 18.6 |
| 50 | 492 | 7.0 | 27 | 68 | 100 | 1.5 | 5.1 | 94.0 |
| 50 | 491 | 6.5 | 26 | 69 | 100 | 1.5 | 5.2 | 92.2 |
| 50 | 482 | 7.5 | 19 | 81 | 99 | 1.2 | 9.9 | 19.5 |
| 50 | 484 | 6.5 | 19 | 80 | 100 | 2.1 | 9.9 | 19.9 |
| 50 | 469 | 3.0 | 10 | 52 | 96 | 1.2 | 4.4 | 19.2 |
| 50 | 470 | 3.6 | 10 | 54 | 97 | 1.6 | 4.3 | 19.4 |
| 50 | 464 | 7.0 | 20 | 80 | 100 | 2.8 | 9.0 | 19.2 |
| 50 | 470 | 2.9 | 10 | 52 | 98 | 1.1 | 4.3 | 18.5 |
| 60 | 506 | 3.0 | 7 | 54 | 94 | 0.2 | 4.9 | 23.4 |
| 60 | 512 | 3.0 | 8 | 53 | 95 | 2.1 | 5.0 | 23.6 |
| 60 | 463 | 1.6 | 17 | 56 | 98 | 3.6 | 7.2 | 21.3 |
| 60 | 465 | 1.7 | 17 | 55 | 98 | 4.7 | 7.3 | 21.9 |
| 60 | 549 | 3.0 | 27 | 64 | 100 | 2.9 | 5.4 | 24.8 |
| 60 | 551 | 3.3 | 27 | 63 | 100 | 2.9 | 5.4 | 25.8 |
| 60 | 551 | 3.0 | 28 | 61 | 100 | 3.0 | 5.4 | 25.9 |
| 60 | 480 | 7.4 | 21 | 76 | 100 | −0.2 | 9.6 | 18.8 |
| 60 | 494 | 7.4 | 21 | 74 | 99 | −0.5 | 10.1 | 18.7 |
| 60 | 414 | 0.3 | 30 | 44 | 95 | 6.9 | 1.5 | 26.0 |
| 60 | 414 | 0.4 | 31 | 42 | 95 | 10.6 | 0.8 | 27.7 |
| 60 | 472 | 5.2 | 21 | 72 | 100 | 0.4 | 4.9 | 16.7 |
| 60 | 474 | 5.0 | 24 | 71 | 100 | 0.2 | 5.1 | 16.8 |
| 60 | 491 | 5.0 | 17 | 78 | 99 | 2.0 | 7.5 | 19.1 |
| 60 | 490 | 5.4 | 17 | 78 | 99 | 1.9 | 7.5 | 19.0 |
| 60 | 498 | 5.6 | 27.8 | 68 | 99 | 1.0 | 10.4 | 18.6 |
| 60 | 515 | 3.2 | 6.3 | 54 | 93 | 1.5 | 4.9 | 24.2 |
| 60 | 519 | 3.2 | 8.5 | 45 | 96 | 2.0 | 5.1 | 24.3 |
| 70 | 486 | 5.5 | 18 | 79 | 99 | 0.5 | 10.4 | 19.0 |
| 70 | 489 | 4.9 | 23 | 74 | 99 | 0.9 | 10.4 | 19.3 |

Table 10 and Table 11 show the average of the data from multiple operations. The main finding from this data is that independent of gas type (amount of nitrogen), solution type, agitator power or temperature as long as positive (excess) dissolved oxygen was maintained in the liquor the process remained oxidative and reversal of the ferrous oxidation reaction was avoided.

The additional findings were as follows:

Sulfur dioxide utilisations of above ~97% were achieved during this trial and were found not to be affected by the oxidation rate. Utilisations were impacted however, by the free acid in solution particularly for the low purity $SO_2$ gases.

High purity $SO_2$ is required in order to achieve consistently high $SO_2$ utilisations for high acidity solutions (50-80 g/L).

Agitator power had no apparent effect on $SO_2$ utilisation in the ranges tested.

A minimum dissolved oxygen (DO) concentration of 5 ppm is required to achieve optimum selectivity of ferrous oxidation over acid generation.

There was no influence of operating temperature on sulfur dioxide utilisation or selectivity of the ferrous oxidation reaction across the temperature range tested (50-70° C.).

The operating strategy of rate limiting by restricting $SO_2$ addition to below the maximum rates of ferrous oxidation and maintaining excess oxygen in solution proved successful in practice.

The selectivity to ferrous oxidation over acid generation is affected by the acidity of solution. As the pH decreases and the acidity rises, the selectivity decreases accordingly.

Tests were conducted to see if any reversing of the ferrous oxidation would occur once the product liquor exited from the reactor. This might have been expected to occur as the amount of residual oxygen would always be low because of its low solubility. Thus if there was a significant concentration of residual sulfur dioxide, it would reduce ferric back to ferrous. It was observed that after aging for 10 days, no reversal of the ferrous oxidation was noted, indicating that the $SO_2$ concentration in solution was held low by the process of the invention.

Example 6

In Example 6, the process of the invention was conducted in situ in a slurry of a uranium ore sourced from tailings from applicant's Olympic Dam Uranium mine. FIG. 11 schematically shows the pilot plant equipment indicated generally at 110 for carrying out the process of the invention in Example 6. The pilot plant 110 includes two 0.2 m³ reactor tanks, 112, 113 in parallel into which is pumped a slurry feed at a rate of from about 50 to 100 L/h each from slurry supply tanks 111a and 111b via a slurry stock tank 114, a stream of ferric containing liquor from solution feed tank 115, and a stream of sulfuric acid from acid supply tank 117. Each reactor tank 112, 113 also includes a dissolved oxygen sensor 138, a redox sensor 146 and an agitator 118 comprising an impeller 120 driven by a motor 122. The percentage of solids in each reactor is typically around 20% (W/W).

A mixture of sulfur dioxide and oxygen gas is fed into the mixture of slurry, acid and ferric liquor in each reactor tank 112, 113 via a respective conduit 132 and gas diffuser 150 which diffuses the gaseous mixture into solution below the impellers 120, by which the gas can be effectively dispersed throughout the slurry mixture. The temperature within each reactor 112, 113 is controlled by means of respective heat exchangers 152 and measured by respective thermometers 154.

The source of iron in the oxidised liquor is largely from gangue minerals such as residual sulfides, siderite and chlorite, that occur with the uranium ore.

The overflow from each reactor 112, 113 reports to a thickener 160. The thickener underflow was operated at a solids density appropriate for the size of the thickener outlet 162 which was 45%, for the pilot plant although it is expected that the solids density would be higher (such as around 55%) for a commercial plant.

The thickener underflow containing the at least partially leached solids reports to a train of additional leaching tanks, in this case, three 0.2 m³ stirred leaching tanks 164a, 164b and 164c, for completion of leaching. Each leaching tank includes an agitator 166a, 166b, and 166c and is fed independently with sulfuric acid from acid supply tank 117, and has independent temperature control.

The thickener overflow reports back to the solution feed tank 115. The level of oxidised liquor in the solution feed tank was kept substantially constant by the addition of other plant liquors, such as raffinate derived from a uranium solvent exchange circuit. The oxidised liquor is recycled back for use in the reactor tanks 112, 113 in order to maintain an optimal reactor solids percentage (such as 20 wt %).

A hand held $SO_2$ detector capable of detecting as low as 1 ppm of $SO_2$ was held close the air liquor interface of the thickener during the course of the process of the invention. In the event of significant residual $SO_2$ in solution, it would be expected that $SO_2$ gas would evolve above the liquor surface. No evidence of $SO_2$ was detected.

The conditions, measured operating parameters and reagent consumptions under which each pilot plant run was conducted are presented in Tables 12, 13 and 14 respectively.

TABLE 12

Conditions of Pilot Plant Runs and Purpose

| Run No. | Purpose |
| --- | --- |
| 5 | Standard SIL operation |
| 6 | Low pH SIL operation |
| 7 | Standard SIL operation |
| 8 | High ORP low pH SIL operation |
| 9 | No $SO_2$ or $O_2$ addition |
| 10 | One hour SIL retention |
| 11 | High ORP SIL operation |

In Table 12, Run 9 is a comparative example against which the process of the invention may be compared. FIG. 12 exemplifies the important control parameters regarding the process of this invention namely sulfur dioxide and oxygen gas flows, dissolved oxygen and the ORP of tank 112. The data shows the ramp up of the process to steady state from start up.

TABLE 13

SIL Pilot Plant Runs and Operating Parameters

| | Operating Parameters (Avg.) | | | | | |
| --- | --- | --- | --- | --- | --- | --- |
| Run No. | Solids Feed (kg/h) | SIL Reactor Retent. hrs | pH | Acidity (g/L) | REDOX (mV) | DO (ppm) |
| Run 5 | 64 | 2 | 1.2 | 12.6 | 562 | 6.7 |
| Run 6 | 55 | 2 | 0.9 | 17.3 | 564 | 8.1 |

TABLE 13-continued

SIL Pilot Plant Runs and Operating Parameters

| | Operating Parameters (Avg.) | | | | | |
|---|---|---|---|---|---|---|
| Run No. | Solids Feed (kg/h) | SIL Reactor Retent. hrs | pH | Acidity (g/L) | REDOX (mV) | DO (ppm) |
| Run 7 | 65 | 2 | 1.0 | 13.9 | 562 | 6.4 |
| Run 8 | 61 | 2 | 0.9 | 19.2 | 640 | 6.5 |
| Run 9 | 64 | 2 | 1.1 | 15.8 | 475 | 4.5 |
| Run 10 | 64 | 1 | 1.3 | 13.1 | 530 | 6.6 |
| Run 11 | 57 | 2 | 1.2 | 12.0 | 618 | 6.2 |

In Table 13, the process parameters for the $SO_2/O_2$ sparged tanks are shown. As is evident, the process was able to be controlled to oxidise the ferrous to reach the ORP (REDOX) values required. Run 9 shows a REDOX value of 475 mV in the absence of the process of the invention compared to the controlled potentials for the other runs. The run 9 value would have ordinarily been lower, but there was a considerable level of ferric ions in the raffinate used as dilution liquor.

TABLE 14

SIL Pilot Plant Runs Reagent Consumptions

Acid, Sulfur Dioxide and Oxygen addition and corrected rate (kg/t)

| Run No. | Acid Add. kg/t | $SO_2$ Add. kg/t | $SO_2$ gas rate (g/min) | $O_2$ Add. kg/t | $O_2$ gas added (g/min) | $O_2/SO_2$ ratio |
|---|---|---|---|---|---|---|
| Run 5 | 34.9 | 9.3 | 5.0 | 8.3 | 4.4 | 0.88 |
| Run 6 | 51.1 | 15.2 | 6.9 | 10.3 | 4.7 | 0.68 |
| Run 7 | 21.7 | 14.1 | 7.7 | 10.1 | 5.5 | 0.72 |
| Run 8 | 36.7 | 12.5 | 6.3 | 9.3 | 4.7 | 0.74 |
| Run 9 | 27.8 | 0.0 | 0.0 | 0.0 | 1.7 | |
| Run 10 | 27.0 | 9.3 | 4.9 | 3.8 | 4.0 | 0.81 |
| Run 11 | 12.0 | 17.4 | 8.3 | 12.0 | 5.9 | 0.72 |

In Table 14, the acid, $SO_2$, and $O_2$ addition rates were calculated, respectively by: dividing the actual acid, $SO_2$, and $O_2$ flow rate by the slurry feed rate. In addition, the table shows the actual gas rates and the ratio of oxygen to sulfur dioxide. As can seen there is no constant ratio. The oxygen requirement is varied depending on conditions. Table 15 shows measured inlet and off gas compositions for measurements taken during Run 10 as well as the calculated utilisations of the gases. It is important to compare this data with the respective data in Tables 10 and 11 in Example 5. What is evident is the range of $SO_2/O_2$ ratio's (View as % $SO_2$ and % $O_2$ in the feed gas) that were used. However in all cases, the dissolved oxygen was controlled and therefore the ferrous oxidation process operated successfully.

TABLE 15

Gas Utilisation Measurements Run 10

| Feed Gas Composition | | Off Gas Composition | | | Gas Utilisation | |
|---|---|---|---|---|---|---|
| $O_2$ (%) | $SO_2$ (%) | $O_2$ (%) | $SO_2$ (%) | $CO_2$ (%) | $SO_2$ (%) | $O_2$ (%) |
| 58.2 | 34.6 | 59.1 | 0.46 | 8.4 | 99.7% | 77.2% |
| 59.9 | 33.17 | 47.1 | 0.29 | 6.4 | 99.9% | 88.2% |
| 57.5 | 35.32 | 62 | 0.08 | 9.7 | 99.9% | 72.6% |
| 57.2 | 35.84 | 49.9 | 0.05 | 6.7 | 100.0% | 86.0% |

TABLE 15-continued

Gas Utilisation Measurements Run 10

| Feed Gas Composition | | Off Gas Composition | | | Gas Utilisation | |
|---|---|---|---|---|---|---|
| $O_2$ (%) | $SO_2$ (%) | $O_2$ (%) | $SO_2$ (%) | $CO_2$ (%) | $SO_2$ (%) | $O_2$ (%) |
| 57.6 | 35.93 | 58 | 0.04 | 8.4 | 100.0% | 80.6% |
| 58.2 | 34.6 | 59.1 | 0.46 | 8.4 | 99.7% | 77.2% |
| 59.9 | 33.17 | 47.1 | 0.29 | 6.4 | 99.9% | 88.2% |
| 57.5 | 35.32 | 62 | 0.08 | 9.7 | 99.9% | 72.6% |
| 57.2 | 35.84 | 49.9 | 0.05 | 6.7 | 100.0% | 86.0% |
| 57.6 | 35.93 | 58 | 0.04 | 8.4 | 100.0% | 80.6% |
| | | | | Average (%) | 99.9% | 80.9% |

References to prior art in this specification are provided for illustrative purposes only and are not to be taken as an admission that such prior art is part of the common general knowledge in Australia or elsewhere.

The invention described herein is susceptible to variations, modifications and/or additions other than those specifically described and it is to be understood that the invention includes all such variations, modifications and/or additions which fall within the spirit and scope of the above description.

The invention claimed is:

1. A scalable and reproducible process for producing a ferric containing solution by the controlled oxidation of a ferrous containing solution, the process including two competing reactions comprising a ferrous oxidation reaction (1) and a sulfuric acid producing reaction (2):

$$2FeSO_4 + O_2(aq) + SO_2(aq) \rightarrow Fe_2(SO_4)_3 \quad (1)$$

$$SO_2 + \tfrac{1}{2}O_2 + H_2O \rightarrow H_2SO_4 \quad (2)$$

wherein reaction (1) has a maximum oxidation rate, the process comprising:
  treating the ferrous containing solution in a reactor with one or more inlet gases containing sulfur dioxide and oxygen;
  controlling the delivery rate of the sulfur dioxide gas to a sulfur dioxide gas delivery rate that is at or below a maximum oxidation rate of ferrous to ferric in reaction (1);
  measuring and controlling the dissolved oxygen in the ferrous containing solution at a value between about 0.5 ppm and about 10 ppm at which:
    i. ferric reduction to ferrous is avoided, and
    ii. the selectivity of ferric production using reaction (1) over acid production using reaction (2) is set according to an acid requirement of the process; and
  controlling the dissolved oxygen at the value while maintaining the sulfur dioxide gas delivery rate, wherein the process is capable of being reproduced under different process and/or reactor conditions by operation of the process under the different conditions at the value of dissolved oxygen.

2. The process of claim 1, wherein said ferrous containing solution is agitated during oxidation.

3. The process of claim 1, wherein the value of dissolved oxygen concentration is controlled by controlling one or more of the following: the flow rate of the oxygen containing gas introduced into said solution; the partial pressure of oxygen in the oxygen containing gas; and the amount of agitation of said solution.

4. The process of claim 1, wherein the ferrous containing solution is a liquor derived from the hydrometallurgical processing of a metal containing material, selected from one or more of an ore, an ore concentrate or a waste material, said liquor comprising a barren leach solution, a pregnant leach solution, a raffinate, a thickener overflow, or a combination of two or more thereof.

5. The process of claim 1 wherein said ferrous containing solution is contained in a slurry.

6. The process of claim 1, wherein said sulfur dioxide and oxygen are introduced to said solution in a gaseous mixture, or in separate gas streams.

7. The process of claim 2, wherein said sulfur dioxide and oxygen are introduced into said solution below said agitator by sparging through a gas emission device.

8. The process of claim 1, wherein the delivery rate of sulfur dioxide is selected to give a maximum ferrous oxidation rate of between 0.1 and 27 g/L/h.

9. The process of claim 1, wherein the temperature of oxidation is between 40° C. and 80° C.

10. The process of claim 1 wherein the value of dissolved oxygen is in the range of 3 to 7 ppm.

11. The process of claim 2 wherein the ferrous containing solution is agitated by one of an air lift reactor, an agitator having a high solidity downward pumping impeller, or a radial type impeller.

\* \* \* \* \*